(12) United States Patent
Zheng

(10) Patent No.: US 9,164,748 B2
(45) Date of Patent: Oct. 20, 2015

(54) INFORMATION BACKUP METHOD AND APPARATUS

(71) Applicant: Tencent Technology (Shenzhen) Company Limited, Shenzhen (CN)

(72) Inventor: Xiaosheng Zheng, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 14/081,988

(22) Filed: Nov. 15, 2013

(65) Prior Publication Data

US 2014/0075430 A1 Mar. 13, 2014

Related U.S. Application Data

(63) Continuation of application No. PCT/CN2013/081649, filed on Aug. 16, 2013.

(30) Foreign Application Priority Data

Aug. 20, 2012 (CN) .......................... 2012 1 0296666

(51) Int. Cl.
*G06F 9/45* (2006.01)
*G06F 9/445* (2006.01)
*G06F 11/14* (2006.01)

(52) U.S. Cl.
CPC .. *G06F 8/62* (2013.01); *G06F 8/61* (2013.01); *G06F 11/1461* (2013.01); *G06F 11/1451* (2013.01); *G06F 11/1469* (2013.01)

(58) Field of Classification Search
CPC ......... G06F 8/61; G06F 8/62; G06F 11/1451; G06F 11/1461; G06F 11/1469; G06F 9/445
See application file for complete search history.

(56) References Cited

U.S. PATENT DOCUMENTS 6,397,351 B1 * 5/2002 Miller et al. .................... 714/13
7,032,220 B2 * 4/2006 Curtis .......................... 717/174

(Continued)

FOREIGN PATENT DOCUMENTS

CN 1662030 A 8/2005
CN 101231682 A 7/2008

(Continued)

OTHER PUBLICATIONS

Dave Marples, "The Open Service Gateway Initiative: An Introductory Overview", [Online], 2001, pp. 110-114, [Retrieved fromInternet on Aug. 5, 2015], <http://ieeexplore.ieee.org/stamp/stamp.jsp?tp=&arnumber=968820>.*

(Continued)

*Primary Examiner* — Thuy Dao
*Assistant Examiner* — Ziaul A Chowdhury
(74) *Attorney, Agent, or Firm* — Morgan, Lewis & Bockius LLP

(57) ABSTRACT

The present invention discloses an information backup method in the field of computer technologies. A log file is monitored at an electronic device that comprises a local memory. A first part of the log file is determined to be associated with a first subset of operations that comprise a first action of uninstalling a specific application. In accordance with the determination, user information that is associated with the specific application is stored in the local memory, and the user information may comprise a user database, a configuration file and a private file generated and updated when a user uses the specific application. A second part of the log file is further determined to be associated with a second subset of operations that comprise a second action of reinstalling the specific application. The user information is extracted from the local memory for use in the second action of reinstalling the specific application.

20 Claims, 7 Drawing Sheets

(56) References Cited

U.S. PATENT DOCUMENTS

| | | | |
|---|---|---|---|
| 7,383,545 B1* | 6/2008 | Yoo | 717/174 |
| 2002/0065999 A1* | 5/2002 | Kikuchi et al. | 711/162 |
| 2004/0045000 A1* | 3/2004 | Hara | 717/178 |
| 2006/0041881 A1* | 2/2006 | Adkasthala | 717/168 |
| 2008/0168245 A1* | 7/2008 | De Atley et al. | 711/162 |
| 2008/0183772 A1* | 7/2008 | Szonye | 707/204 |
| 2008/0307175 A1* | 12/2008 | Hart et al. | 711/162 |
| 2009/0235243 A1* | 9/2009 | Jung et al. | 717/168 |
| 2009/0260004 A1* | 10/2009 | Datta et al. | 717/175 |
| 2010/0153336 A1* | 6/2010 | Zak | 707/610 |
| 2010/0311391 A1* | 12/2010 | Siu et al. | 455/411 |
| 2012/0084848 A1* | 4/2012 | Kim et al. | 726/7 |
| 2012/0117127 A1 | 5/2012 | MacDonald | |
| 2012/0129503 A1* | 5/2012 | Lindeman et al. | 455/414.1 |
| 2012/0240108 A1* | 9/2012 | Baraldi et al. | 717/176 |
| 2013/0067451 A1* | 3/2013 | Hussain et al. | 717/172 |
| 2013/0311836 A1* | 11/2013 | Hurst et al. | 714/48 |

FOREIGN PATENT DOCUMENTS

| | | |
|---|---|---|
| CN | 101605294 A | 12/2009 |
| CN | 101989211 A | 3/2011 |
| CN | 102523593 A | 6/2012 |
| CN | 102831035 A | 12/2012 |

OTHER PUBLICATIONS

Ian H. Witten et al., "Greenstone: Open-Source Digital Library Software with End-User Collection Building", [Online], 2001, pp. 1-10, [Retrieved from Internet on Aug. 5, 2015], <http://researchcommons.waikato.ac.nz/bitstream/handle/10289/1501/01IHW-DB-SB-Greenstoneopen.pdf?sequence=1>.*

Bugra Gedik et al., "MobiEyes: Distributed Processing of Continuously Moving Queries on Moving Objects in a Mobile System", [Online], 2004, pp. 67-87, [Retrieved from Internet on Aug. 5, 2015], <http://download.springer.com/static/pdf/951/chp%253A10.1007%252F978-3-540-24741-8_6.pdf>.*

Walter C. Wong et al., "Local Disk Depot—Customizing the Software Environment", [Online], 1993, pp. 49-53, [Retrieved from Internet on Aug. 5, 2015], <http://static.usenix.org/publications/library/proceedings/lisa93/full_papers/wong.pdf>.*

Tencent Technology, ISRWO, PCT/CN2013/081649 Nov. 28, 2013, 11 pgs.

Tencent Technology, IPRP, PCT/CN2013/081649, Feb. 24, 2015, 6 pgs.

* cited by examiner

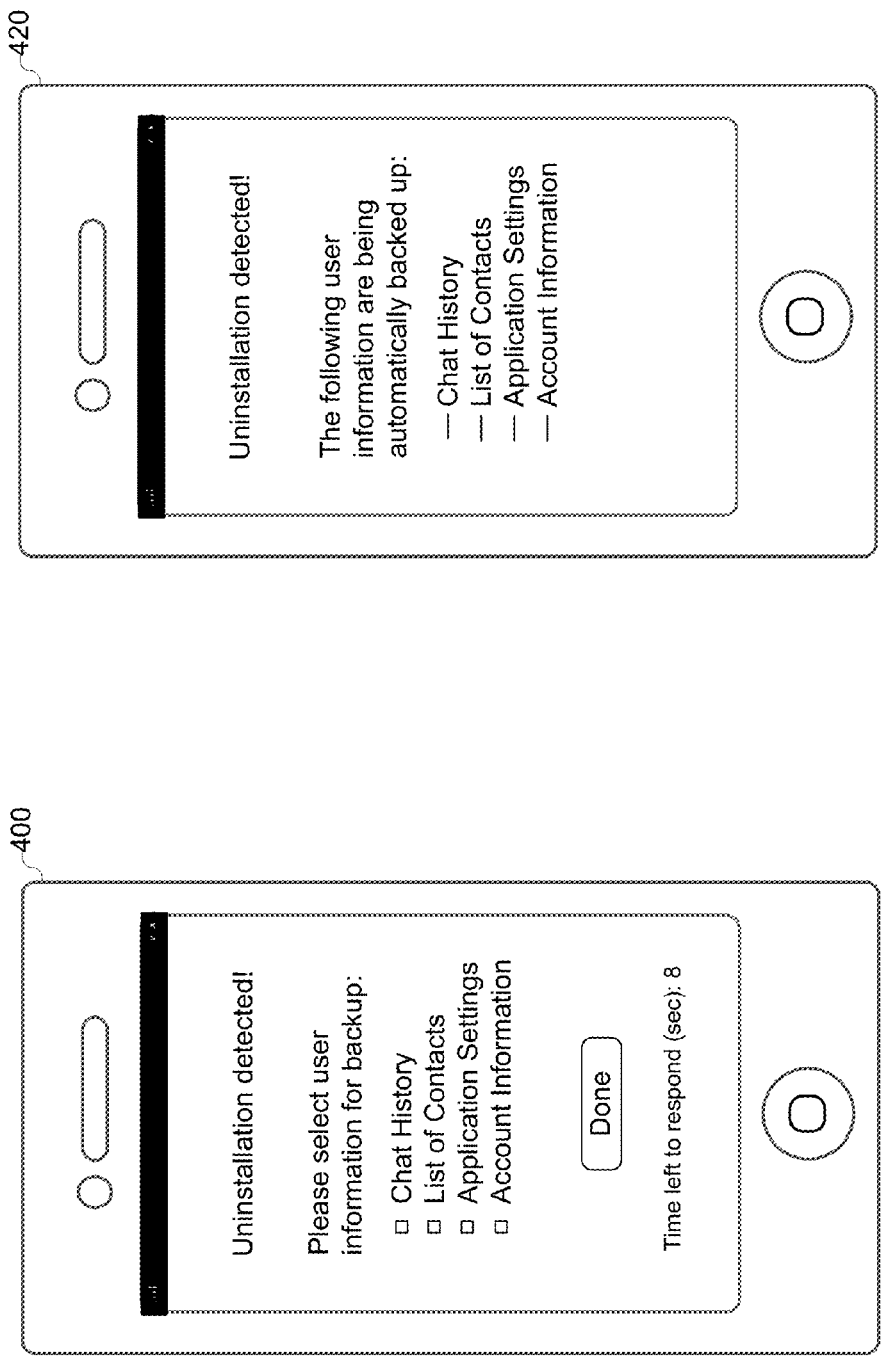

INFORMATION BACKUP METHOD AND APPARATUS

RELATED APPLICATIONS

This application is a continuation application of PCT Patent Application No. PCT/CN2013/081649, entitled "INFORMATION BACKUP METHOD AND APPARATUS" filed on Aug. 16, 2013, which claims priority to Chinese Patent Application No. 201210296666.7, entitled "INFORMATION BACKUP METHOD AND APPARATUS," filed on Aug. 20, 2012, both of which are incorporated by reference in their entirety.

TECHNICAL FIELD

The disclosed implementations relate generally to the field of computer technology, and particularly, to systems, methods and devices for backing up user information associated with a software application and supporting efficient reinstallation and recovery of the application in an electronic device.

BACKGROUND

Mobile devices, in place of many conventional electronic devices, are widely applied in our daily life, offering unprecedented user experiences due to their readily accessible and extremely accommodating characteristics. For instance, laptop computers are able to implement most functions of desktop computers, while allowing users to work anywhere. Tablets and smart phones constantly update users with useful information (e.g., emails, messages, weather, and stock price), serve their entertainment needs, and support various educational and social activities. In particular, smart phones have become indispensable to many people's working and personal life during the past few years.

Although these mobile devices are mainly developmental products of hardware technologies, the unprecedented user experiences are largely enabled by tremendous amount of software applications developed on various mobile platforms. As of January 2013, 900,000 applications are available for downloading in the Apple App Store by iPhone or iPad users. Mobile device users may regularly install, uninstall, recover and update software applications as they need due to easy access to miscellaneous applications.

During operation, each application generates unique user information, including application configuration/settings and personal data that is stored within the mobile device. Data management of the user information could impose a challenge on the mobile device during both courses of operating and uninstalling the corresponding application. In particular, if the user information is mistakenly deleted upon uninstallation, it may not be recoverable when the application is reinstalled, and the loss of the user information may seriously comprise the user experience of the recovered application in the future. Shared by other electronic devices, this information management problem is more pronounced in mobile devices, because these devices normally involve more frequent operations on software applications.

As a solution, a backup plug-in is integrated in another application to receive from the application a message that indicates an uninstalling action. This other application passively waits for the message and subsequently initializes to back up the user information associated with the uninstalled application. However, the uninstalled application oftentimes does not realize a need to send the message for actively inducing the backup process, and therefore, fails to send the necessary message. Not receiving this message, the other application is blind to the ongoing uninstallation process, and thus, fails to back up the user information of the uninstalled application. Therefore, a need exists to improve data management of software applications particularly during the course of application uninstallation and recovery.

SUMMARY

The present invention relates to an information backup method in the field of computer technologies, and particularly, to systems, methods and devices for backing up user information associated with a software application to allow efficient reinstallation and recovery of the application within an electronic device.

In accordance with one aspect of the invention, an information backup method is implemented at an electronic device that comprises a local memory. A log file is monitored, and a first part of the log file is subsequently determined to be associated with a first subset of operations that comprise a first action of uninstalling a specific application. In accordance with the determination, user information that is associated with the specific application is stored in the local memory, and the user information may comprise a user database, a configuration file and a private file generated and updated when a user uses the specific application. A second part of the log file is further determined to be associated with a second subset of operations that comprise a second action of reinstalling the specific application. The user information is extracted from the local memory for use in the second action of reinstalling the specific application.

In accordance with another aspect of the invention, a non-transitory computer-readable medium is applied to back up user information for a specific application. The computer-readable medium has instructions stored thereon, which when executed by one or more processors in an electronic device cause the processors to perform operations including monitoring a log file, determining that a first part of the log file is associated with a first subset of operations comprising a first action of uninstalling a specific application, storing the user information in a local memory, determining that a second part of the log file is associated with a second subset of operations comprising a second action of reinstalling the specific application, and extracting the user information that is stored in the local memory for use in the second action of reinstalling the specific application.

Further in accordance with one aspect of the invention, an electronic device is applied to back up user information for a specific application. The electronic device comprises one or more processors and memory having instructions stored thereon, which when executed by the one or more processors cause the processors to perform operations including monitoring a log file, determining that a first part of the log file is associated with a first subset of operations comprising a first action of uninstalling a specific application, storing the user information in a local memory, determining that a second part of the log file is associated with a second subset of operations comprising a second action of reinstalling the specific application, and extracting the user information that is stored in the local memory for use in the second action of reinstalling the specific application.

Other embodiments and advantages are apparent to those skilled in the art in light of the descriptions and drawings in this specification.

BRIEF DESCRIPTION OF DRAWINGS

For a better understanding, reference should be made to the following detailed description taken in conjunction with the accompanying drawings, in which:

FIGS. 4A and 4B are two exemplary user interfaces that are created on a display of an electronic device when a specific application is determined to be uninstalled in accordance with some embodiments.

Like reference numerals refer to corresponding parts throughout the drawings.

DETAILED DESCRIPTION

Reference will now be made in detail to various implementations, examples of which are illustrated in the accompanying drawings. In the following detailed description, numerous specific details are set forth in order to provide a thorough understanding of the present disclosure and the described implementations herein. However, implementations described herein may be practiced without these specific details. In other instances, well-known methods, procedures, components, and mechanical apparatus have not been described in detail so as not to unnecessarily obscure aspects of the implementations.

Figure 1:
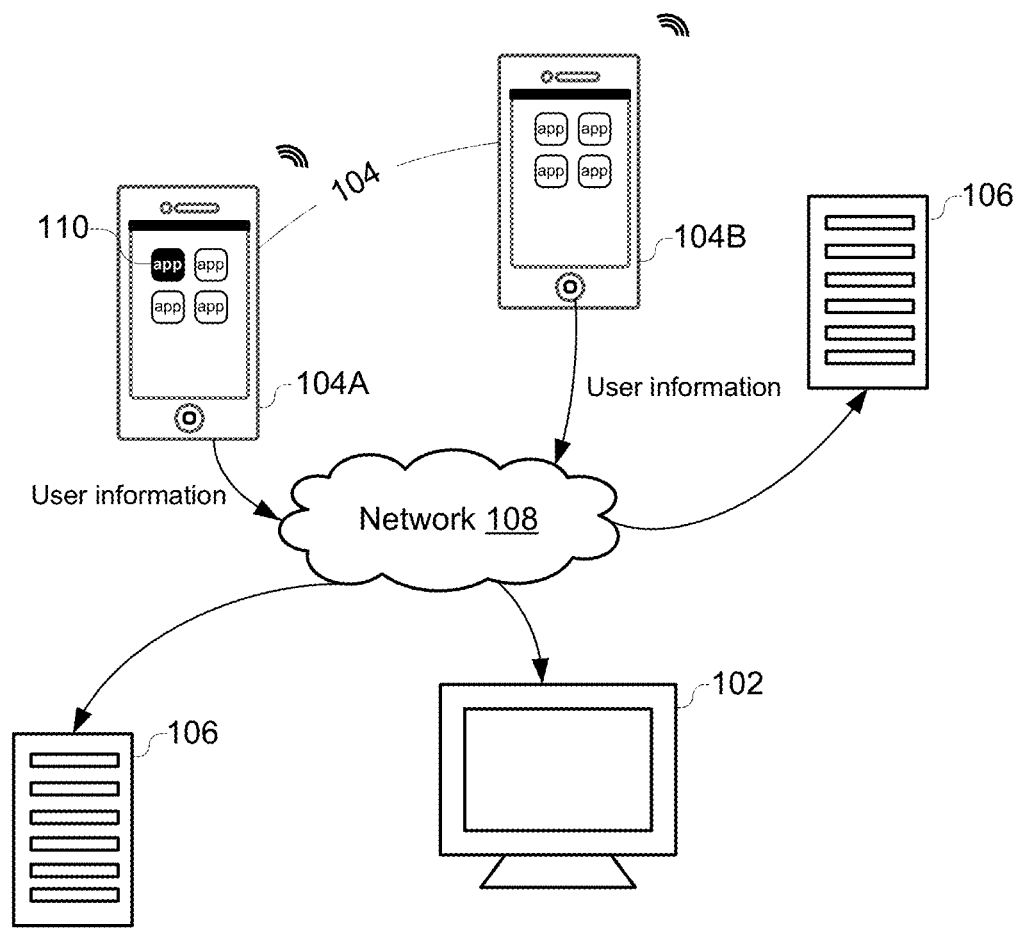
FIG. 1 illustrates an exemplary data backup system including one or more electronic devices and servers and in accordance with some embodiments.

FIG. 1 illustrates an exemplary data backup system 100 including one or more electronic devices and in accordance with some embodiments. Each of the electronic devices may preferably include, but is not limited to, a desktop or laptop computer 102, a mobile phone 104, a tablet computer, or a Personal Digital Assistant (PDA). These electronic devices are coupled among each other or to servers 106 via a communication network 108. In certain embodiments, the servers 106 may be regarded as electronic devices. The communication network 108 can be one or more networks having one or more type of topologies, including but not limited to the Internet, intranets, local area networks (LANs), cellular networks, Ethernet, Storage Area Networks (SANs), telephone networks, Bluetooth communication and the like.

Each individual electronic device, such as one mobile device 104, is normally installed with multiple software applications used to serve different purposes including making calls, sending emails and messages, chatting, reading news, shopping, paying bills and checking information (e.g., stock prices and weather). As a result of these activities, each application generates a set of user information that may comprise a user database, a configuration file and a private file. In some embodiments, downloaded pictures and documents may be stored in the user database. Settings and configurations of the specific application are maintained in the configuration file. Account names and passwords are stored in the private file which may require a higher level of security.

Each software application may generate one or two categories of the user information, and is not required to generate all three categories. For instance, a simple application for browsing the Internet may result in several downloaded pictures stored in the user database, but not necessarily produce a configuration file or a private file. In contrast, an instant messaging application may generate all three categories of user information, including a database that keeps record of a general chat history and detailed chat contents for each individual chat, a configuration file that defines the settings of the application, and a private file that stores the user name and password for at least one chat account.

In some embodiments, the user information may be managed and stored remotely in the server 106. In particular, in a social network application where pictures and diaries are uploaded to the server 106, the corresponding database, configuration and private file may be stored remotely in the server 106 that is most probably owned and managed by a social media. In other preferred embodiments, the local software applications retain control of the user information, and therefore, are programmed to reserve some or all user information in a local memory of the electronic device although a cached copy of the user information may still be created and stored by the server 106. Under these circumstances, the mobile devices 104 may communicate with the servers 106 in order to receive the cached copy from or to share the reserved user information with the servers 106.

In some embodiments, the mobile devices 104 are coupled to exchange and share their respective user information via telecommunication networks sponsored by commercial wireless carriers (e.g., AT&T, Verizon and T-Mobile). In addition, each mobile device 104 may be further coupled to a desktop or laptop computer 102 via a wired or wireless communication network 108. The user information is transferred from the mobile device 104 to the computer 102 in a similar way associated with a regular data synchronization process.

In accordance with some embodiments, the user information stored in an electronic device, e.g., a mobile device 104A, may be optionally communicated to and backed up in various locations within the data backup system 100, when a corresponding application 110 is uninstalled from the specific electronic device. In a preferred embodiment, the user information may be proactively backed up in a local memory of the electronic device that comprises the uninstalled application 110 as a local application. In doing so, the electronic device can enhance data security by confining the user information within itself during operation and after uninstallation of the specific application 110.

The electronic device may be coupled to another electronic device selected from a mobile device 104B, the computers 102 and the servers 106. In accordance with the preferred embodiment, the user information of the local application may be further transferred to this other electronic device for centralized storage and management once it is backed up within the electronic device. In addition to the above preferred implementations, the user information of the specific application may also be directly backed up by this other electric device.

Regardless of the electronic device used for information backup or storage, the mobile device 104B and the computers 102 could be controlled by the same user of the electronic device (i.e., the mobile device 104A in this instance) that generates the user information. Therefore, the user information could be securely stored in an external electronic device, but remain readily accessible to the user.

On the other hand, the servers 106 may be a host that sponsors the uninstalled application 110 during regular operation and herein maintains the user information upon uninstallation of the application. In certain embodiments, the server 108 is not related to the specific application 110, and rather, provides a unique data backup service established for backing up data that are generated by different applications and different users. As a result, the user information is centralized for storage and management in this other electronic device.

Furthermore, the user information has to be conveniently retrievable, when the specific application 110 needs to be reinstalled on the electronic device (the mobile device 104 in this instance). In some embodiments, the specific application is an upgraded version of the uninstalled specific application, while in some other embodiments, the identical specific application is reinstalled after a previous uninstallation. The user database, configurations and private information is recovered for use in the specific application 110, and therefore, the user may enjoy smooth software reinstallation without losing previous records or setting up the application as new.

Figure 2:
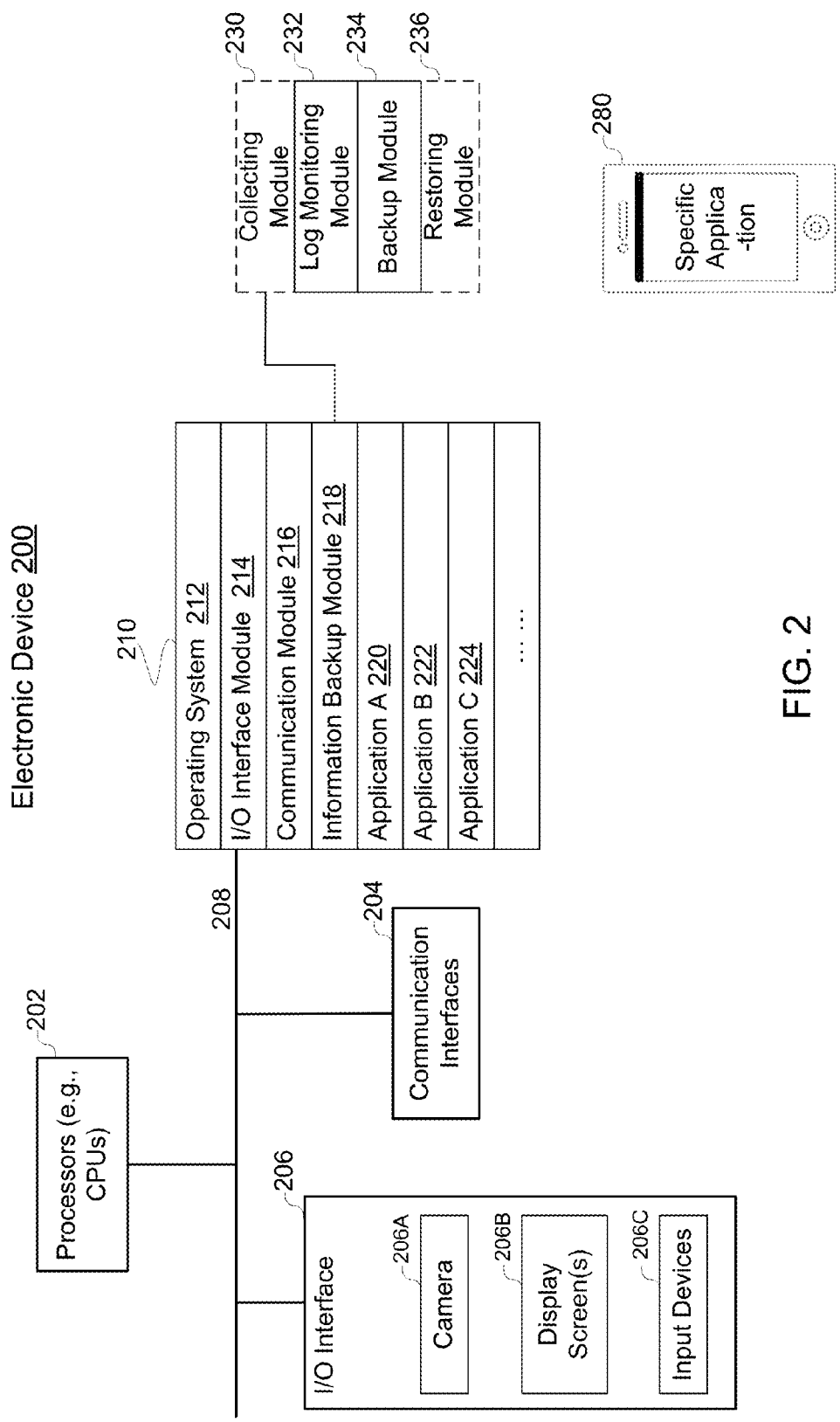
FIG. 2 illustrates an exemplary block diagram of an electronic device that is used for backing up user information in accordance with some embodiments.

FIG. 2 illustrates an exemplary block diagram 200 of an electronic device that is used for backing up user information in accordance with some embodiments. The user information is generated by a specific application and arranged for a backup within a local memory of the electronic device 200. In accordance with some embodiments, the electronic device 200 proactively monitors a log file that tracks a plurality of operations that may relate to the specific application, detects uninstallation of the specific application, and thereby stores a subset or all of the user information within its local memory. Both the specific application and the log file belong to a same electronic device that may or may not be the electronic device 200.

The electronic device 200 typically includes one or more processing units 202 (sometimes called CPUs or processors) for executing programs (e.g., programs stored in memory 210), one or more communication interfaces 204, memory 210, an input/output (I/O) interface 206 (e.g., touch screen, keypads, camera 206A, display screen 206B), and one or more communication buses 208 for interconnecting these components. Memory 210 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 210 optionally includes one or more storage devices remotely located from the CPU(s) 202. Memory 210, or alternately the non-volatile memory device(s) within memory 210, comprises a non-transitory computer readable storage medium. In some embodiments, memory 210 or the computer readable storage medium of memory 210 stores the following programs, modules and data structures, or a subset thereof:

- an operating system 212 that includes procedures for handling various basic system services and for performing hardware dependent tasks;
- a communication module 214 that is used for coupling the electronic device 200 to other devices via the one or more communication interfaces 204 (wired or wireless) and one or more communication networks, such as the Internet, other wide area networks, local area networks, metropolitan area networks, and so on;
- an optional I/O interface module 216 that receives commands from the user via input devices 206C and generates user interface objects in the display device 206B;
- an information backup module 218, as described herein; and
- application modules A-C that are respectively associated with software applications A, B and C used for implementing various functions, such as web browsing, online shopping and chatting.

In some embodiments, the programs or modules identified above correspond to sets of instructions for performing a function described above. The sets of instructions can be executed by one or more processors (e.g., the CPUs 202). The above identified modules or programs (i.e., sets of instructions) need not be implemented as separate software programs, procedures or modules, and thus various subsets of these programs or modules may be combined or otherwise re-arranged in various embodiments. In some embodiments, memory 210 stores a subset of the modules and data structures identified above. Furthermore, memory 210 may store additional modules and data structures not described above.

In accordance with some embodiments, the information backup module 218 is reserved for backing up user information associated with a specific application that may or may not be included in the electronic device 200. The information backup module 218 at least comprises a log monitoring module 232 and a backup module 234. The log monitoring module 232 monitors the log file that contains information denoting a queue of jobs. The queue of jobs comprises a plurality of operations that may include uninstallation of the specific application. When uninstallation is detected in the log monitoring module 232, the backup module 234 stores the user information associated with the specific application within a local memory.

In some embodiments, the information backup module 218 further comprises a collecting module 230 that identifies and obtains a package name of a corresponding software package that constitutes the specific application, and/or a restoring module 236 that retrieves the stored user information for recovering or reinstalling the corresponding uninstalled application.

In a preferred embodiment as discussed above, the electronic device 200 represents the electronic device that contains the specific application, and therefore, the specific application is a local application within the electronic device 200. In this situation, the electronic device 200 actually monitors the log file generated by its own operating system 212. An uninstallation action may be detected for the specific application, as soon as it is internally queued in the log file or enabled for execution. As an example, the information backup module 218 may back up the user information associated with application A, B or C that are installed locally.

In certain embodiments, the electronic device 200 is distinct from another electronic device 280 that holds the specific application to be uninstalled. Nevertheless, the log monitoring module 232 manages the electronic device 200 to proactively obtain the log file from the other electronic device 280 that actually generates the log file. Subsequently, the log monitoring module 232 checks the log file for the uninstallation action that is occurring or will occur within the electronic device 280, and in response to a positive detection, the backup module 234 backs up the user information within the local memory of the electronic device 200, i.e., remotely away from the other electronic device 280. Specifically as discussed above, the electronic device 200 may be selected from a mobile device, a server or a computer that receives both the log file and the user information from this other electronic device 280 via a wired or wireless communication network.

Figure 3:
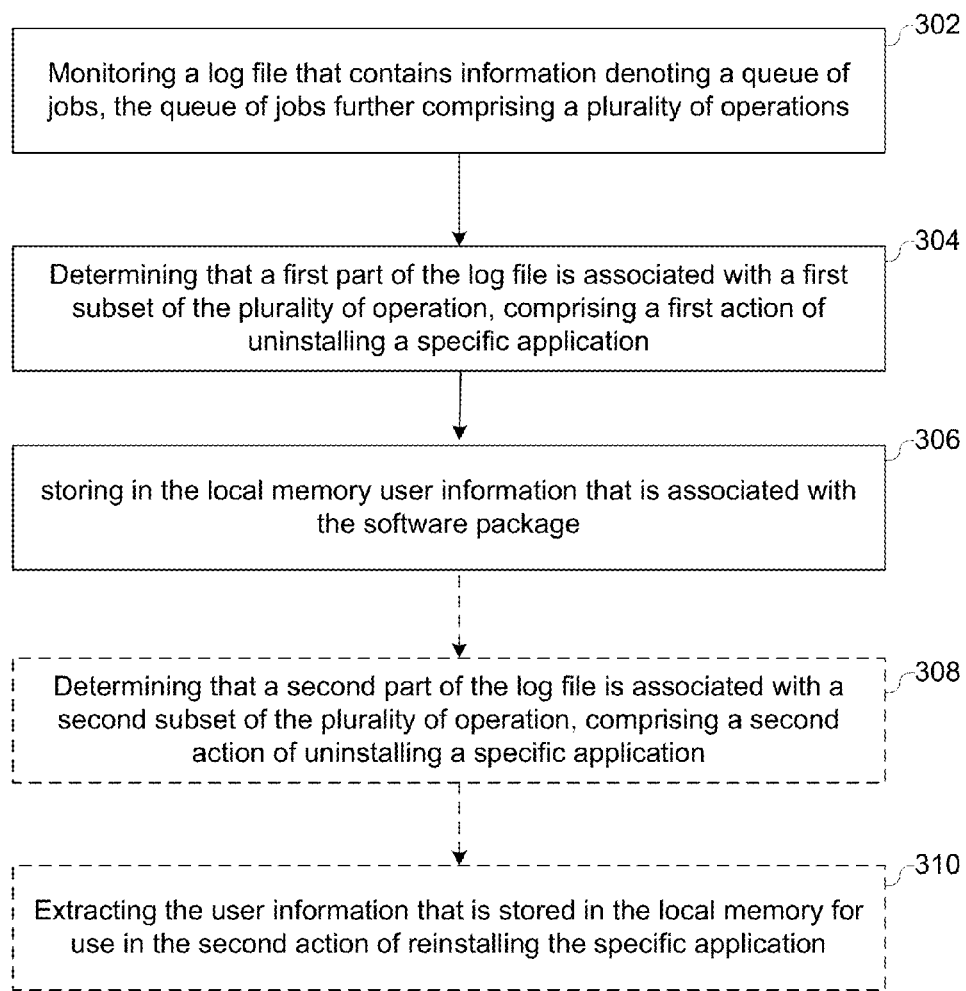
FIG. 3 illustrates an exemplary flowchart for a method for backing up user information associated with a specific application by an information backup module in accordance with some embodiments.

FIG. 3 illustrates an exemplary flowchart for a data backup method 300 for backing up user information associated with a specific application by an information backup module 218 in accordance with some embodiments. The log monitoring module 232 monitors (302) a log file that generally contains information denoting a queue of jobs. The queue of jobs further includes a plurality of operations, and a first subset of these operations comprises an action of uninstalling the specific application.

The log file is critical during the course of implementing of the information backup method 300. In computing, the log file generally records events taking place in the execution of a system in order to provide an audit trail that can be used to understand the activity of the system and to diagnose problems. In this instance, the log file is maintained and monitored in real time to track the plurality of operations that are scheduled for implementation. To be specific, each line of the log file may include, but is not limited to, execution time, execution action and execution object for real-time recording of each operation under execution. In some embodiments, the log file may record the action of uninstallation that has been initialized, and however, the user information is not yet purged, when the information backup method 300 is initialized.

The information backup module 218 may add a monitoring thread in a background thread pool, and the monitoring thread is always in a running state, so that the content of the log file is read in real time through the monitoring thread, thereby implementing the monitoring step (302) on the log file. As a specific example for an Android-based platform, logcat data may be processed as a thread of execution in the background of operation. Therefore, by monitoring the log file in real time, the electronic device may conveniently recognize the ongoing action of uninstallation based on the contents of the log file.

In addition to a real-time determination of uninstallation, the information backup method is preferred to be implemented in a predictive manner. The log file may contain operations that are scheduled, but not initialized, for actual implementation. In response to a detection of upcoming uninstallation of the specific application, the information backup module 218 stores the user information in advance, before uninstallation of the specific application is even initialized. In doing so, the electronic device protects the user information from data corruption that may occur as early as the start of the uninstallation action.

In accordance with some embodiments, this specific application may include, but is not limited to, QQ, Word and WeChat, and is identified by a package name of a corresponding software package that constitutes the specific application. When an operation is executed on the specific application, the package name is incorporated in a script associated with the operation, so as to identify an execution object of the operation.

To positively identify uninstallation, the log monitoring module 232 may determine (304) that a part of the log file refers to a specific action of uninstallation. An action generally refers to an operation on an application, such as uninstalling the application, adding a shortcut and dialing a phone number. In this instance, the action is to uninstall the specific application. As an example, on an Android-based platform, the script that relates to such an uninstallation action is Android.intent.action.DELETE embedded in a line of the logcat data, and the specific application is uninstalled as a result of running the script. However, in addition to such information concerning the action of uninstallation, it needs to be determined (304) whether a certain part (e.g., a line) of the log file also contains the name of the corresponding software package that constitutes the specific application.

The order is flexible as to determining the action of uninstallation and determining the package name in the part of the log file. A determination rule may be set as determining the Action of uninstalling the application in the log file either prior to or subsequent to determining the package name. In a particular embodiment, a line of the log file is read, and the content of the log file is compared with a script corresponding to the action of uninstalling a specific application. If a segment of the log file content matches the corresponding script, it is determined that the log file contains the Action of uninstalling the application. The line of the log file is subsequently compared with the package name of the application. When a segment of the log file content matches the package name as well, it is determined that the specific application is being or will be uninstalled. However, if the content of the log file is different from the script corresponding to the action of uninstalling an application, the determination procedure is terminated, avoiding a waste of system resources for searching out the package name and therefore improving overall efficiency.

In accordance with the determination (304), the backup module 234 stores (306) in a local memory user information that is associated with the corresponding software package. In some implementations, the step of storing (306) the user information may further include (a) creating an interface to prompt the user to determine a set of backup options for storing the user information, and (b) in accordance with the set of backup options, storing the user information selectively in the local memory.

The user may be prompted at a display interface of the electronic device to back up the user information of the application. Exemplary prompting manners include, but are not limited to, a dialog box prompt on a display screen 206B or a voice prompt via a speaker. FIG. 4A is an exemplary user interface 400 that is created on the display screen of the electronic device when the specific application is determined to be uninstalled in accordance with some embodiments. On the display interface 400, the user is prompted to select a part or all user information for backup. In some embodiments, the user may be also prompted to determine a path where the user information may be stored.

Typically, the user information further comprises one or more of a user database, a configuration file and a private file which together constitute classified information generated when a user uses the specific application. For example, the user database normally includes downloaded pictures and documents, chat histories or lists of contacts. In contrast, setting information of fonts and background colors are stored in the configuration file, and confidential account names and passwords are stored in the private file. In some embodiments, a part, rather than all, of the user information needs to be backed up upon uninstallation of the corresponding application.

In particular, a backup option may be set forth by the user for selectively backing up each category of the user information. In some embodiments, a detailed backup inquiry is displayed at the display interface for the user to determine the backup option concerning each category of the user information. When the user fails to respond within a preset time, the respective category of the user information may be restrained from backing up in order to reduce complexity of the backup operation. The preset time may be randomly set, for example, at 5 seconds or 10 seconds. See FIG. 4A.

FIG. 4B is another exemplary user interface 420 that is created on the display interface of the electronic device when the specific application is determined to be uninstalled in accordance with some embodiments. In this embodiment, the user information is backed up automatically without prompting the user to enter a user input concerning the backup options. A simple message is displayed on the user interface 420 to remind the user of the backup operation. Complexity of the backup operation is largely reduced by such an automatic backup operation, and so may the user experience improve. However, a predetermined default option is still available to allow the user to determine whether all or a part of the user information may be backed up automatically. When a part of the user information is backed up automatically, each category of the user information may be selected for a default backup, and for example, the configuration file could be always set to be automatically backed up.

As illustrated in FIG. 3, the user information may be extracted and further applied in a subsequent reinstallation process for the specific application. To do so, the information backup method 300 may further comprise a step of determining (308) that a second part of the log file is associated with a second subset of the plurality of operations, and this subset comprises a second action of reinstalling the specific application. In certain embodiments, the log file is constantly updated according to the queue of jobs existing in the electronic device, and therefore, may have been entirely updated between steps 304 and 308.

In accordance with the determination (308), the previously-stored user information is extracted (310) from the local memory for use in the action of reinstalling the specific application. The reinstalled specific application may be an identical application that the user has previously removed, or an updated version of the uninstalled specific application.

In some embodiments, the user information has to be extracted (310) within a certain time window, after the user information is stored (306) in the local memory. Otherwise, the user information is purged from the local memory, if it is not used for reinstalling the specific application within the time window.

In some embodiments, the step of extracting (310) the user information may further include (a) creating an interface to prompt the user to determine a set of recovery options for recovering the user information in the installed specific application, and (b) in accordance with the set of recovery options, selectively extracting the user information in the local memory.

Figure 4D:
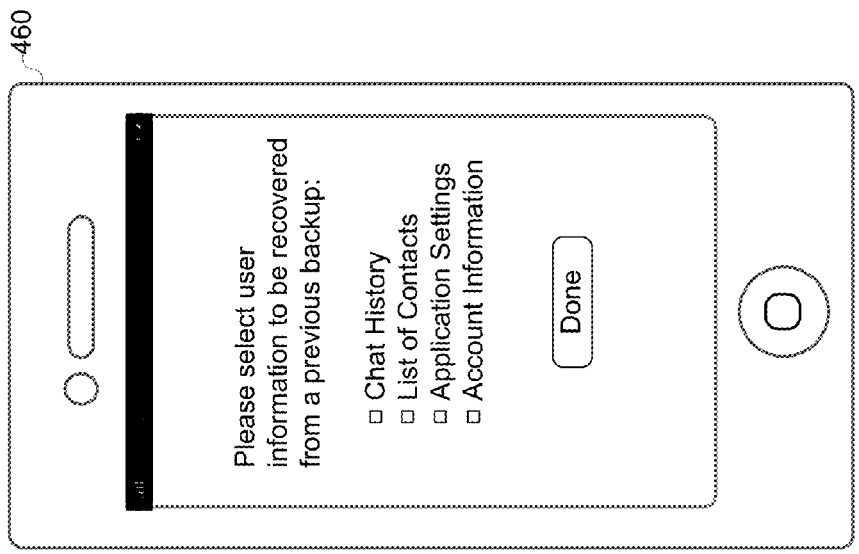
FIGS. 4C and 4D are two exemplary user interfaces that are created on a display of an electronic device when a specific application is determined to be reinstalled in accordance with some embodiments.
Figure 4C:
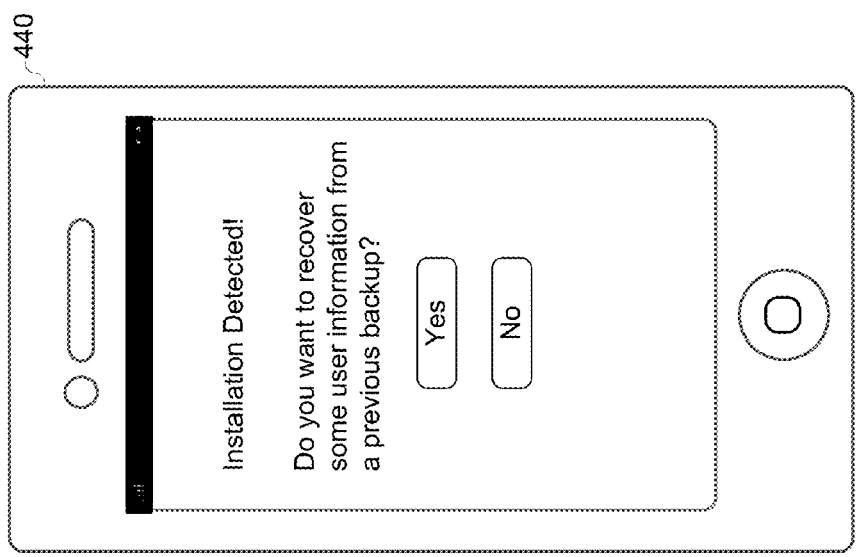

The user may be prompted at a display interface of the electronic device to select the recovery options. FIGS. 4C and 4D are two exemplary user interfaces 440 and 460 that are created on the display interface of the electronic device when the specific application is determined to be reinstalled in accordance with some embodiments. On the display interface 440, the user is prompted to determine whether he wants to recover some user information from a previous back. If the user selects "No," the specific application is reinstalled as new without resorting to previous user information. However, if the user selects "yes," another interface 460 pops up, prompting the user to select specific categories of the user information for recovery.

Figure 5:
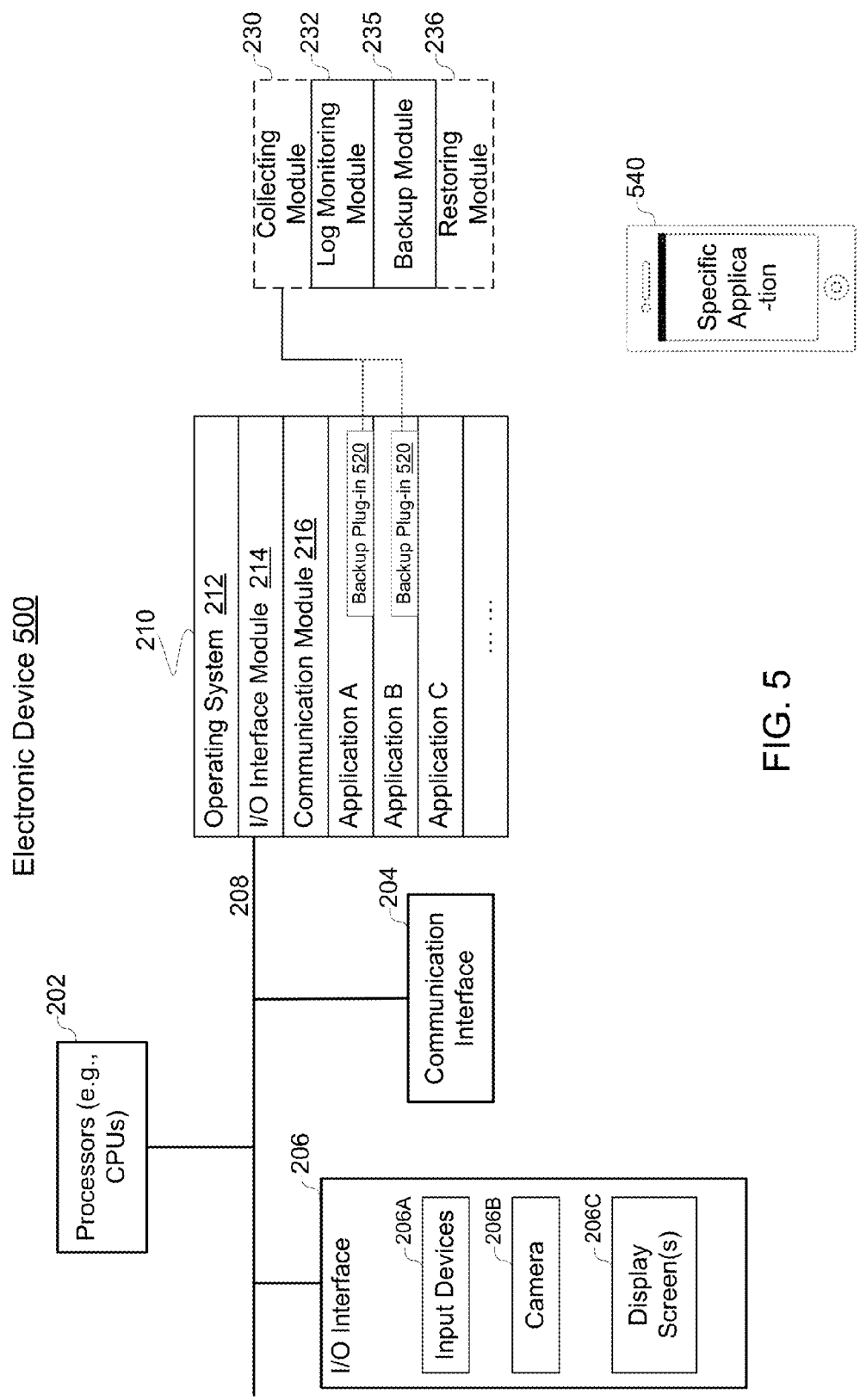
FIG. 5 illustrates another exemplary block diagram of an electronic device that is used for backing up user information in accordance with some embodiments.

FIG. 5 illustrates another exemplary block diagram of an electronic device 500 that is used for backing up user information in accordance with some embodiments. Rather than a dedicated information backup module 218, a backup plug-in 520 is associated with a specific application, integrated into another parent application (e.g., Application A or B in this instance), and applied to invoke the electronic device 500 to back up the corresponding user information when the specific application is uninstalled. The backup plug-in 520 may similarly comprise a collecting module 230, a log monitoring module 232, a backup module 235 and a restoring module 236.

Each backup plug-in 520 is bound in the respective parent application through a specific interface, and the specific application is therefore referred to as a local application of the backup plug-in 520. This specific application may be identified by a package name of a corresponding software package that constitutes the specific application. In some embodiments, the collecting module 230 in the backup plug-in 520 may obtain the package name of the specific application through an Application Programming Interface (API) of the application.

In some implementations, the backup plug-in 520 is integrated in more than one application, e.g., both applications A and B, such that the user information of one specific application may be managed or backed up by different applications. For instance, the backup plug-ins 520 in both applications A and B determine that the specific application is being uninstalled. The database and the configuration file may be backed up by application A, while the private file may be backed up by application B. When the specific application is reinstalled, the backup plug-ins 520 of applications A and B retrieve their respective user information, such that the specific application may be properly recovered according to the retrieved user information.

In a preferred embodiment, the electronic device 500 represents an electronic device where the specific application is initially installed, and the specific application is a local application within the electronic device 500. As an example, the specific application is application C stored in the memory 210. Both backup plug-ins 520 are linked to application C, and actually monitors the log file generated by the local operating system 212. As a result, the log monitoring module 232 in the backup plug-ins 520 detects an uninstallation action of the application C, as soon as the action is internally queued in the log file or enabled for execution.

The backup module 235 in the backup plug-ins 420 may back up the user information locally within the electronic device 500. However, in some embodiments, the user information is further communicated to and stored in another electronic device selected from a mobile device, a computer and a server.

On the other hand, the specific application may be installed in an electronic device 540 that is distinct from the electronic device 500. Nevertheless, the log monitoring module 232 manages the electronic device 500 to proactively obtain the log file from the other electronic device 540 that generates the log file. Subsequently, the log monitoring module 232 checks the log file for the uninstallation action that is occurring or will occur on the other electronic device 540, and in response to a positive detection, the backup module 234 backs up the user information within the local memory of the electronic device 500, i.e., remotely away from the electronic device 540. Specifically, the electronic device 500 may be selected from a mobile device, a server or a computer that receives both the log file and the user information from the other electronic device 540 via a wired or wireless communication network.

As illustrated in FIGS. 2 and 5, the extrinsic backing up solutions involving electronic devices 280 and 540 are particularly useful for ensuring efficient data and resource management. In particular, the local memory itself may have a limited size in the electronic device 540 where the specific application is installed, and the size of the user information could be relatively large for local storage. Storage in another device may effectively overcome these problems. Moreover, in some embodiments, the user information may be centralized in one computer for various applications running on different electronic devices owned by a common user, or in a server for one specific application installed on various devices owned by different users. Therefore, such extrinsic backing up solutions may be utilized under some particular circumstances.

Figure 6:
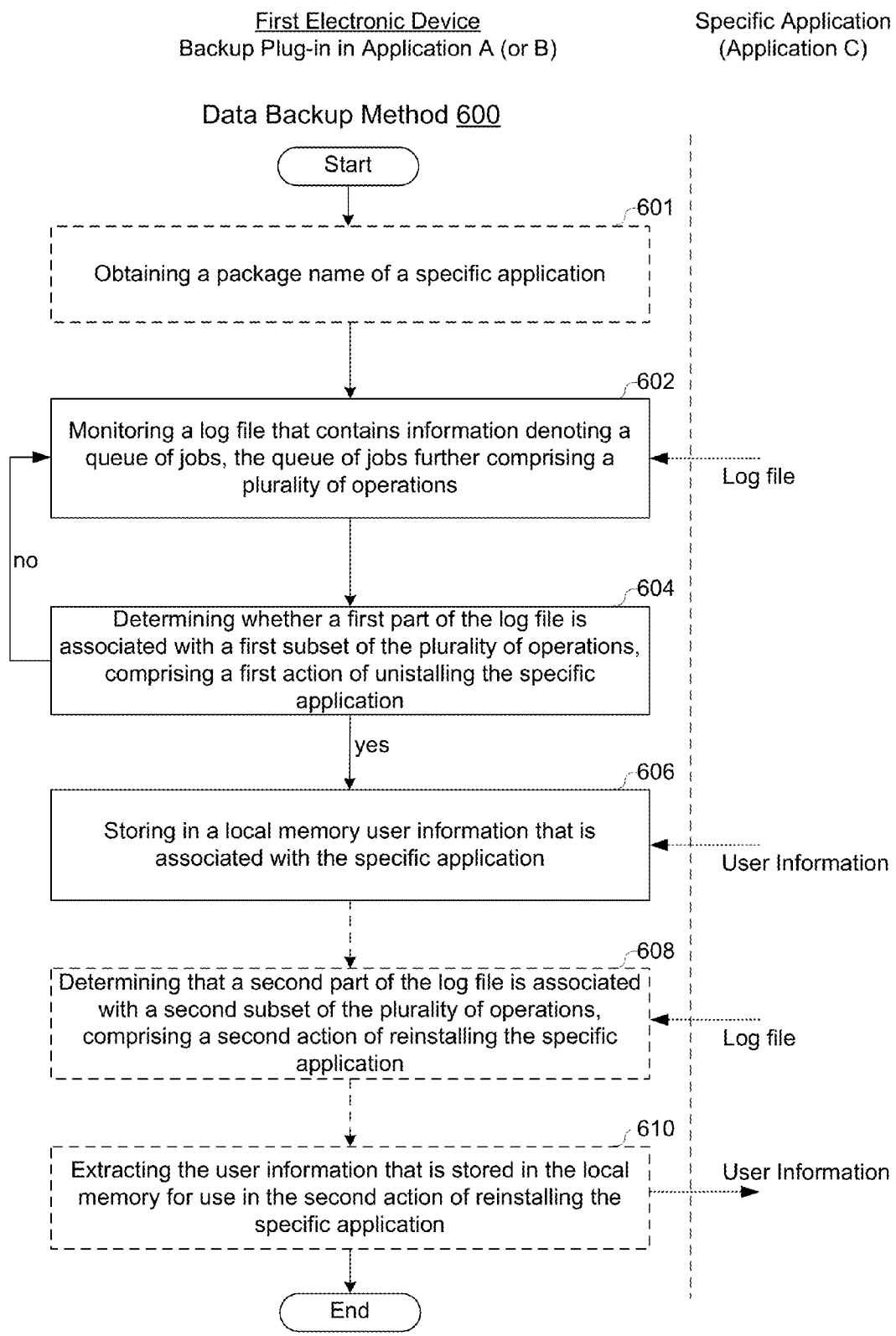
FIG. 6 illustrates another exemplary flow chart for a method of backing up user information associated with a specific application in accordance with some embodiments.

FIG. 6 illustrates another exemplary flow chart for a data backup method 600 of backing up user information associated with a specific application in accordance with some embodiments. The method 600 is implemented via a corresponding backup plug-in 520 incorporated in at least one application that is different from the specific application. In particular, applications A (or B) and C refer to the at least one other application and the specific application, respectively. Application A or B is implemented within a first electronic device, and incorporates one respective backup plug-in 520 for backing up the user information associated with application C. Application C (i.e., the specific application) is optionally located locally within the first electronic device or within a second electronic device that is located remotely from the first electronic device.

The backup plug-in first obtains (601) a name of a software package that constitutes the specific application.

In accordance with a location of the specific application (C), the first electronic device collects a log file locally in the first electronic device or remotely from the second electronic device. As discussed above, the log file contains information denoting a queue of jobs. The queue of jobs may further comprise a plurality of operations that may involve the specific application.

The log file is monitored (602) by the backup plug-in in application A. Application A further determines (604) that a subset of the plurality of operations associated with a part of the log file comprises an action of uninstalling a software package that constitutes the specific application. In some embodiments, the determining (604) further comprises determining the part of the log file including the corresponding package name of the software package.

In accordance with a positive determination, the user information of the specific application is stored in a local memory of the first electronic device. In some embodiments, both applications A and B are involved in the information backup operation. Both applications A and B monitor (602) the log file and determine (604) that a first part of the log file is associated with a first action of uninstalling the specific application. The respective backup plug-in 520 in each application (A or B) may select one category of user information, e.g., a configuration file, and different back plug-ins 520 may end up selecting different categories of user information for backing up at step 606.

The user information may be further applied to reinstall the specific application. To do so, the information backup method 600 may further comprise a step of determining (608) that another part of the log file is associated with another subset of the plurality of operations, and this other subset comprises another action of reinstalling the software package of the specific application. In some embodiments, different categories of the user information are collected according to the particular backup plug-ins 520 in the involved applications, such that the previously-stored user information is extracted (610) from the local memory of the first electronic device for use in the action of reinstalling the software package. The reinstalled specific application may be an identical application that the user has previously removed, or an updated version of the uninstalled specific application, i.e., application C herein.

One of those skilled in the art may see that the backup plug-in 520 manages the user information based on information in the log file. The log file has to be available to the backup plug-in 520 at steps 602 and 606, such that the backup plug-in 520 may proactively determine whether the respective action of uninstallation or installation is running or pending on the second electronic device. Therefore, the user information concerning the specific application are stored into and retracted from the local memory in the first electronic device in accordance with the respective determination of application uninstallation and reinstallation.

Such a user information backup method 600 may be implemented with no or litter user intervention. Based on the restored user information, the specific application may automatically return to its original status prior to the uninstallation action. The user may not even be aware of any change in terms of his experiences with the application. Such an enhanced user experience is particularly critical for many gaming or social networking applications installed on mobile devices. Given that these applications may be regularly uninstalled, installed or updated, the users would benefit from such a user information backup method by enjoying a smooth transition between the original and updated applications.

When application C (i.e., the specific application) is located in the second electronic device, both the log file and the user information have to be communicated between the first and second electronic device during the course of implementing the method 600. On one hand, the log file has to be transferred to the first electronic device, such that the backup plug-in 520 may determine whether the actions of uninstallation and installation are running or pending on the second electronic device. On the other hand, the user information concerning the specific application are transferred from and returned to the first electronic device, when the information needs to be stored in or extracted from the local memory for information backup (606) or recovery (610), respectively. The log file and the user information may be transferred via a wired or wireless communication network established between the electronic devices.

The above disclosures are merely preferred implementations of the present invention, but are not intended to limit the scope of the claims of the present invention. Any equivalent change made according to the claims of the present invention modification still falls within the scope of the present invention.

While particular implementations are described above, it will be understood it is not intended to limit the invention to these particular implementations. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present invention. First ranking criteria and second ranking criteria are both ranking criteria, but they are not the same ranking criteria.

The terminology used in the description of the invention herein is for the purpose of describing particular implementations only and is not intended to be limiting of the invention.

As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. An information backup method, comprising:
   at an electronic device that comprises a local memory, while monitoring a log file that contains information denoting a queue of jobs that comprises a plurality of operations, the queue of jobs further including a first action of uninstalling a user-selected application and a second action of reinstalling the user-selected application:
   determining that a first part of the log file is associated with a first subset of the plurality of operations, the first subset of operations comprising the first action of uninstalling the user-selected application;
   in accordance with a determination of the first action of uninstalling the user-selected application, storing in the local memory user-selected information that is associated with the user-selected application, the user-selected information comprising a user database, a configuration file and a private file generated and updated when a user uses the user-selected application, wherein the log file, the user database, the configuration file and the private file are distinct from each other;
   determining that a second part of the log file is associated with a second subset of the plurality of operations, the second subset of operations comprising the second action of reinstalling the user-selected application; and
   in accordance with a determination of the second action of installing the user-selected application, extracting the user-selected information that is stored in the local memory for use in the second action of reinstalling the user-selected application.

2. The method according to claim 1, wherein the reinstalled specific application is an upgraded version of the uninstalled specific application.

3. The method according to claim 1, wherein determining that the first part of the log file is associated with the first subset of the plurality of operations further comprises:
   determining that the first part of the log file comprises a corresponding package name of a software package in the specific application.

4. The method according to claim 1, wherein the step of storing in the local memory the user information further comprises:
   creating a user interface to prompt the user to determine a set of backup options for storing the user information, and
   in accordance with the user-determined set of backup options, selectively storing the user information in the local memory.

5. The method according to claim 4, wherein the set of backup options allow the user to select a subset of the user information for backing up.

6. The method according to claim 1, wherein the step of extracting the user information that is stored in the local memory further comprises:
   creating a user interface to prompt the user to determine a set of recovery options for recovering the user information in the installed specific application, and
   in accordance with the user-determined set of recovery options, selectively extracting the user information that are stored in the local memory.

7. The method according to claim 6, wherein the set of recovery options allow the user to select a subset of the user information for use in the reinstalled specific application.

8. The method according to claim 1, wherein the user information is automatically stored in the memory without prompting the user to enter a user input that selects options for backing up the user information.

9. The method according to claim 1, wherein the user information is extracted within a certain time window since the user information is stored in the local memory.

10. The method according to claim 9, wherein the user information is purged from the local memory if it is not used for reinstalling the specific application within the time window.

11. The method according to claim 1, wherein the user information is further transferred from the electronic device to another electronic device for centralized user information storage and management.

12. The method according to claim 1, wherein the log file is maintained and monitored in real-time to track the plurality of operations that are scheduled for implementation in the electronic device.

13. The method according to claim 12, wherein the first action of uninstalling the specific application is initialized, and the user information is not purged yet when the information backup method is implemented.

14. The method according to claim 1, wherein the electronic device comprises a first electronic device that is coupled to a second device, and the specific application is initially installed on the second device, the log file being created on the second device and transferred to the first device, the user information of the specific application in the second device is thereby being backed up in the first device.

15. The method according to claim 1, wherein the specific application comprises a first application in the electronic device, and the electronic device further comprises a second application that includes a first backup plug-in, the first backup plug-in implementing each step in the information backup method and storing a first subset of the user information, the first subset of the user information comprising at least one of the user database, the configuration file and the private file.

16. The method according to claim 15, wherein the electronic device comprises a third application that includes a second backup plug-in, and the second back-up plug-in repeat each step in the information backup method and stores a second subset of the user information, the second subset of the user information being distinct from the first set of the user information and comprising at least one of the user database, the configuration file and the private file.

17. A non-transitory computer-readable medium, having instructions stored thereon, which when executed by one or more processors in an electronic device cause the processors to perform operations comprising:
    while monitoring a log file that contains information denoting a queue of jobs that comprises a plurality of operations, the queue of jobs further including a first action of uninstalling a user-selected application and a second action of reinstalling the user-selected application:
    determining that a first part of the log file is associated with a first subset of the plurality of operations, the first subset of operations comprising the first action of uninstalling the user-selected application;
    in accordance with a determination of the first action of uninstalling the user-selected application, storing in the local memory user-selected information that is associated with the user-selected application, the user-selected information comprising a user database, a configuration file and a private file generated and updated when a user uses the user-selected application, wherein the log file, the user database, the configuration file and the private file are distinct from each other;
    determining that a second part of the log file is associated with a second subset of the plurality of operations, the second subset of operations comprising the second action of reinstalling the user-selected application; and
    in accordance with a determination of the second action of installing the user-selected application, extracting the user-selected information that is stored in the local memory for use in the second action of reinstalling the user-selected application.

18. The non-transitory computer-readable medium according to claim 17, wherein the operation of extracting the user information that is stored in the local memory further comprises:
    creating a user interface to prompt the user to determine a set of recovery options for recovering the user information in the installed specific application, the set of recovery options allowing the user to select a subset of the user information for use in the reinstalled specific application, and
    in accordance with the set of recovery options, selectively extracting the user information that are stored in the local memory.

19. An electronic device, comprising:
one or more processors; and
memory having instructions stored thereon, which when executed by the one or more processors cause the processors to perform operations, comprising:
    while monitoring a log file that contains information denoting a queue of jobs that comprises a plurality of operations, the queue of jobs further including a first action of uninstalling a user-selected application and a second action of reinstalling the user-selected application:
    determining that a first part of the log file is associated with a first subset of the plurality of operations, the first subset of operations comprising the first action of uninstalling the user-selected application;
    in accordance with a determination of the first action of uninstalling the user-selected application, storing in the local memory user-selected information that is associated with the user-selected application, the user-selected information comprising a user database, a configuration file and a private file generated and updated when a user uses the user-selected application, wherein the log file, the user database, the configuration file and the private file are distinct from each other;
    determining that a second part of the log file is associated with a second subset of the plurality of operations, the second subset of operations comprising the second action of reinstalling the user-selected application; and
    in accordance with a determination of the second action of installing the user-selected application, extracting the user-selected information that is stored in the local memory for use in the second action of reinstalling the user-selected application.

20. The electronic device according to claim 19, wherein the operation of storing in the local memory the user information further comprises:
    creating a user interface to prompt the user to determine a set of backup options for storing the user information, and
    in accordance with the set of backup options, storing the user information selectively in the local memory.

* * * * *